(12) United States Patent
Park et al.

(10) Patent No.: US 12,384,716 B2
(45) Date of Patent: Aug. 12, 2025

(54) METHOD OF MANUFACTURING FLEXIBLE COVER WINDOW AND FLEXIBLE COVER WINDOW MANUFACTURED USING SAME

(71) Applicant: UTI INC., Chungcheongnam-do (KR)

(72) Inventors: Deok Young Park, Gyeonggi-do (KR); Jae Young Hwang, Gyeonggi-do (KR); Kukhyun Sunwoo, Gyeonggi-do (KR); Tea Joo Ha, Chungcheongnam-do (KR)

(73) Assignee: UTI INC., Chungcheongnam-do (KR)

( * ) Notice: Subject to any disclaimer, the term of this patent is extended or adjusted under 35 U.S.C. 154(b) by 34 days.

(21) Appl. No.: 17/552,950

(22) Filed: Dec. 16, 2021

(65) Prior Publication Data

US 2022/0194848 A1  Jun. 23, 2022

(30) Foreign Application Priority Data

Dec. 18, 2020 (KR) .......................... 10-2020-0178950

(51) Int. Cl.
  *C03C 21/00* (2006.01)
  *G06F 1/16* (2006.01)

(52) U.S. Cl.
  CPC .......... *C03C 21/002* (2013.01); *G06F 1/1652* (2013.01); *C03C 2204/00* (2013.01)

(58) Field of Classification Search
  None
  See application file for complete search history.

(56) References Cited

U.S. PATENT DOCUMENTS

| | | | |
|---|---|---|---|
| 2019/0337844 A1* | 11/2019 | Ikeda | C03C 3/087 |
| 2019/0375679 A1* | 12/2019 | Gross | C03C 21/002 |
| 2022/0048813 A1* | 2/2022 | Kim | C03C 23/0025 |
| 2022/0291712 A1* | 9/2022 | Baby | C03C 21/002 |
| 2023/0250013 A1* | 8/2023 | Noda | C03C 15/00 65/31 |

* cited by examiner

*Primary Examiner* — Lisa L Herring
(74) *Attorney, Agent, or Firm* — Mendelsohn Dunleavy, P.C.

(57) ABSTRACT

Proposed is a flexible cover window manufacturing method capable of simultaneously reinforcing a plane part and a folding part by using alkali-based metal ions having an ionic radius smaller than that of alkali-based metal ions contained in a glass. A flexible cover window manufactured using the same method is also proposed. The plane part and the folding part are simultaneously reinforced using alkali-based metal ions having a smaller ionic radius than alkali-based metal ions included in a glass to simplify the process, and the flexible cover window ensures strength and folding characteristics by controlling tensile stress of the entire part of the flexible cover window.

9 Claims, 3 Drawing Sheets

ION SUBSTITUTION REGION: THE SURFACE HAS THE HIGHEST CONCENTRATION OF SUBSTITUTION IONS, AND THE CONCENTRATION DECREASES TOWARD THE CENTER.

THICK GLASS

THIN GLASS

THICK GLASS HAS A SMALLER TOTAL ELONGATION OF THE GLASS BECAUSE THE AREA OF ELONGATION IN THE TOTAL VOLUME IS SMALLER THAN THAT OF THIN GLASS ( FIRST REINFORCEMENT )

( SECOND REINFORCEMENT )

PRIOR ART (FIRST REINFORCEMENT)    (SECOND REINFORCEMENT)

METHOD OF MANUFACTURING FLEXIBLE COVER WINDOW AND FLEXIBLE COVER WINDOW MANUFACTURED USING SAME

CROSS REFERENCE TO RELATED APPLICATION

The present application claims priority to Korean Patent Application No. 10-2020-0178950, filed Dec. 18, 2020, the entire contents of which is incorporated herein for all purposes by this reference.

BACKGROUND OF THE INVENTION

Field of the Invention

The present disclosure relates to a manufacturing method for a glass-based cover window and a flexible cover window manufactured using the same. The present disclosure relates to a flexible cover window manufacturing method capable of simultaneously reinforcing a plane part and a folding part by using alkali-based metal ions having a smaller ion radius than alkali-based metal ions included in glass, and a flexible cover window manufactured through the same method.

Description of the Related Art

In recent years, electrical and electronic technologies are rapidly developing, and various types of display products are emerging to meet the needs of the new era and the needs of various consumers.

In the case of a flexible display, research is basically being conducted on displays in the form bending, rolling, and stretching starting from folding. A cover window for protecting the display panel as well as the display panel should be formed to be flexible.

Such a flexible cover window should have good flexibility and should not cause marks on the folding part even when repeatedly being folded, and there should be no distortion of image quality.

For the cover window of the existing flexible display, a polymer film such as PI or PET has been used on the surface of the display panel.

However, in the case of a polymer film, due to its weak mechanical strength, it simply serves to prevent scratches on a display panel, is vulnerable to impact resistance, has low transmittance, and is known to be relatively expensive.

In addition, in the case of such a polymer film, as the number of folds of the display increases, marks are left on the folding part, resulting in damage to the folding part. For example, pressing or tearing of the polymer film occurs during the evaluation of the folding limit (normally 200,000 times).

Recently, in order to overcome the limitations of the cover window of the polymer film, various studies on glass-based cover windows have been conducted.

In the case of a glass-based cover window, there is a need for basic required physical properties that satisfy folding characteristics, have no distortion of the screen, have sufficient strength even in repeated contact such as by a touch pen, and a certain pressure.

In order to satisfy the strength characteristics of the cover window, the glass should be a certain thickness or more, and to satisfy the folding characteristics, the glass should be less than a certain thickness. In addition, there is a need for research on the optimal cover window thickness and structure without distortion of the screen.

According to the related art, there are many technologies in which a glass is formed to satisfy the folding characteristics and strength characteristics, and a folding area (folding part) of a cover window is formed to be relatively slimmer than other areas (plane part).

In order to reinforce the strength of such a cover window, a chemical reinforcement method is mainly used. In the chemical reinforcement, when an alkali-based glass is immersed in a high-temperature $KNO_3$ molten salt, compressive stress is generated on the glass surface due to the substitution of K ions in the molten salt and Na ions in the glass. At this time, the volume of the glass increases due to the influence of K ions having a large atomic size.

In particular, when the folding part is formed to be slim, the natural explosion, breakage, or waviness of the cover window may occur due to the high compression ratio in the folding part due to the imbalance of tensile stress according to the thickness, which will seriously affect the quality of the product.

FIGS. 1A and 1B illustrate an imbalance of tensile stress due to a difference in thickness between a folding part and a plane part in a conventional flexible cover window. As shown, a phenomenon in which the thin plane part is more increased, resulting in deterioration of the overall quality of the cover window.

In order to solve this problem, a method of adjusting the degree of reinforcement between the folding part and the plane part has been tried, but it is difficult to secure uniformity of reinforcement on the entire cover window. Non-uniformity problems of compressive stress (CS) and reinforcement depth (DOL) remain for each cover window position.

SUMMARY OF THE INVENTION

The present disclosure has been derived from the above necessity, and the objective of the present disclosure is to provide a method for manufacturing a flexible cover window for simultaneously reinforcing a plane part and a folding part using alkali-based metal ions having an ion radius smaller than that of alkali-based metal ions included in glass, and the flexible cover window using the same.

In order to achieve the above objective, the present disclosure provides a method for manufacturing a flexible cover window for simultaneously reinforcing a plane part and a folding part using an alkali-based metal ion having an ionic radius smaller than that of the alkali-based metal ion contained in glass, and a flexible cover window manufactured thereby.

In addition, the alkali-based metal ion having a smaller ionic radius than that of the alkali-based metal ion contained in the glass is preferably lithium.

In addition, the manufacturing method of the flexible cover window is preferably performed using a molten salt containing potassium ions and lithium ions.

Moreover, the said molten salt contains $KNO_3$, $NaNO_3$, and $LiNO_3$ preferably.

In addition, according to the method of manufacturing the flexible cover window, a first reinforcing process may be performed by using a molten salt including potassium ions and lithium ions, and then a second reinforcing process may be performed by using a molten salt including potassium ions.

In addition, the molten salt used in the first reinforcing process contains $KNO_3$, $NaNO_3$, and $LiNO_3$ preferably.

In addition, $KNO_3$ should be contained in an amount of 20 to 70 parts by weight and $LiNO_3$ in an amount of 0.1 to 5 parts by weight based on the total molten salt.

In addition, the molten salt used in the second reinforcing process preferably includes any one or both of $LiNO_3$ and $NaNO_3$ while including $KNO_3$.

In addition, the amount of $LiNO_3$ is preferably equal to or less than that in the first reinforcing process.

In addition, the amount of $LiNO_3$ is preferably contained in an amount of 0.1 to 2 parts by weight based on the total molten salt.

The present disclosure relates to a glass-based cover window. In particular, the present disclosure provides a flexible cover window that maintains a reinforced glass-specific texture while simultaneously reinforcing a plane part and a folding part using alkali-based metal ions having a smaller ionic radius than alkali-based metal ions included in glass to simplify a process. A flexible cover window in which strength and folding characteristics are secured is provided by adjusting the tensile stress of the entire area.

In particular, the present disclosure provides to prevent deformation, bending, and breakage due to a difference in tensile stress of a glass substrate after reinforcement due to a difference in thickness between a plane part and a folding part. By performing the chemical reinforcement process using metal ions, there is no need for an additional process such as a masking process in the existing partial chemical reinforcing process, thereby improving mass productivity.

Accordingly, by simultaneously chemically reinforcing the plane part and the folding part, problems of reinforcement non-uniformity such as dispersion and precision coating of the coating solution, which is a conventional partial chemical reinforcement process, and deviation of the upper and lower ends due to the stagnant phenomenon of the coating solutions, are completely solved. Since the masking process is not performed, the process may be simply performed.

DETAILED DESCRIPTION OF THE INVENTION

Figure 1A:
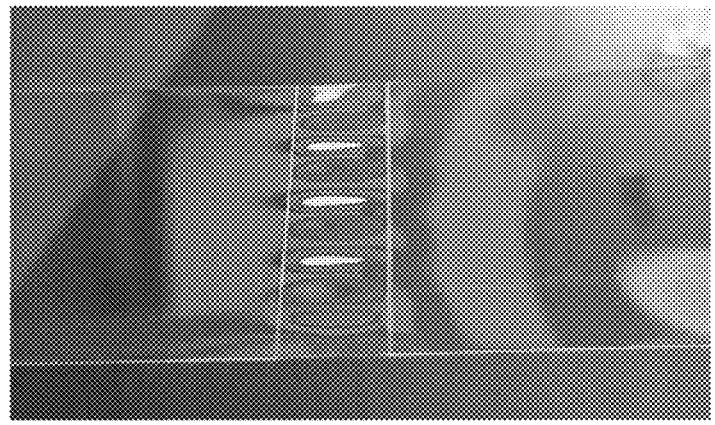
FIGS. 1A and 1B are views showing a photograph of a flexible cover window according to the related art.
Figure 1B:
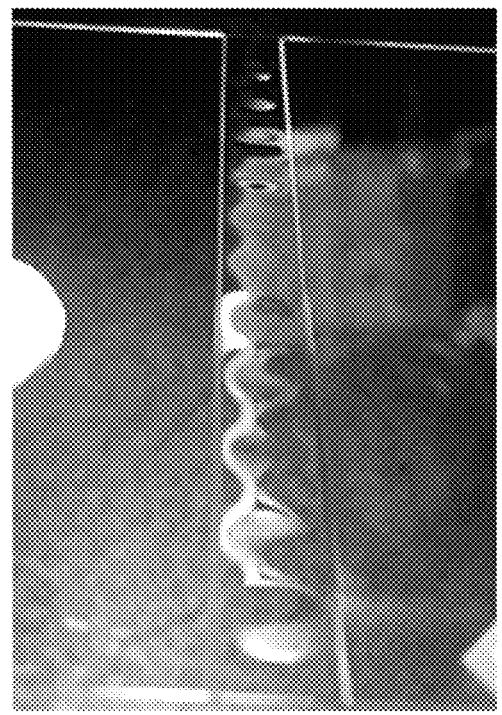

The present disclosure relates to a glass-based cover window. In particular, the present disclosure provides a flexible cover window that maintains a reinforced glass-specific texture, simultaneously reinforcing a plane part and a folding part using alkali-based metal ions having a smaller ionic radius than alkali-based metal ions included in glass to simplify a process. A flexible cover window in which strength and folding characteristics are secured is provided by adjusting the tensile stress of the entire area.

In particular, the present disclosure provides a flexible cover window to prevent deformation, bending, and breakage due to a difference in tensile stress of a glass substrate after reinforcement due to a difference in thickness between a plane part and a folding part. By performing the chemical reinforcement process using metal ions, there is no need for an additional process such as a masking process in the existing partial chemical reinforcement process, thereby improving mass productivity.

Accordingly, by simultaneously chemically reinforcing the plane part and the folding part, problems of reinforcement non-uniformity such as dispersion and precision coating of the coating solution, which is a conventional partial chemical reinforcement process, and deviation of the upper and lower ends due to the stagnant phenomenon of the coating solutions, are completely solved. Since the masking process is not performed, the process may be simply performed.

The present disclosure relates to a method for manufacturing a flexible cover window for simultaneously reinforcing a plane part and a folding part using an alkali metal ion having a smaller ionic radius than an alkali metal ion contained in glass, and a flexible cover window manufactured using the same.

In the present disclosure, the term "front surface" means a surface that a user may touch, which means a surface that a touch pen or the like comes into contact with, and means a surface in an upward direction in the drawings. In the present disclosure, the "rear surface" is a surface opposite to the front surface and means a surface opposite to the touch, that is, a surface in a direction toward the display panel, and a surface in a downward direction in the drawing.

In the present disclosure, the "folding area" of the display refers to an area in which the display is folded or bent in half, and the area in which the cover window is folded corresponding to this area is referred to as the "folding part" (F) of the cover window in the present disclosure. The flat area excluding the folding part (F) is referred to as the "plane part" (P) of the cover window.

In particular, the present disclosure is formed on a glass-based substrate, and the glass substrate 100 is formed entirely flat (the thickness of the folding part (F) and the plane part (P) are the same), or the folding part (F) is segmented into one or more sections. Accordingly, the glass substrate 100 may be formed into two-piece, three-piece, or the like as a whole.

In addition, the folding part (F) may be formed by slimming to have a thinner thickness than the plane part (P). Generally, the thickness of the plane part (P) of the cover window is 30 to 300 μm, and the thickness of the folding part (F) is about 10 to 100 μm, and the folding part (F) is formed by processing a very thin glass plate.

Here, the folding part (F) may have a uniform thickness or may be formed to gradually increase in thickness from the center of the folding area toward the outside. That is, the cross-section of the folding part (F) may be formed in a straight-line or curved shape.

When the folding part (F) is formed in a straight-line shape, folding characteristics are further improved compared to the technology formed in a curved shape. If the folding part (F) has a curved shape, a range of the minimum thickness is relatively small, and when the folding is repeated, the folding characteristics such as breakage when folding in the thick part are degraded. When the folding part (F) has a uniform thickness as a whole, that is, when the folding part is formed in a straight-line shape having the same thickness, a region constituting the minimum thickness is formed widely to improve flexibility, restoring force, and elastic force, thereby improving folding characteristics.

In addition, it is not easy to align the center part of the curved folding part (F) when assembling mechanically, but the folding part (F), according to the present disclosure, has a uniform thickness. It is possible to reduce assembly tolerance when assembling, that is, when bonding to the front of the display panel, thereby minimizing differences in quality between products and reducing the defect rate.

As described above, the advantages of the straight-line shaped folding part (F) are more than the advantages of the curved shape folding part (F), but it may be manufactured by selecting the straight-line shaped folding part (F) or the curved shape folding part (F) according to the specifications of the product.

Here, the width of the folding part (F) is designed in consideration of the radius of curvature when the cover window is folded and is approximately set to the radius of curvature x π. The thickness of the cover window in the folding part (F) is formed of 10 to 100 μm, which is related to the folding part (F).

If the depth of the folding part F is too deep, that is, if the folding area of the cover window is too thin, foldability is good, but wrinkles or strength are disadvantageous during reinforcement process. When the folding area of the cover window is too thick, flexibility, restoring force, and elastic force in the folding area are degraded, and thus, the thickness of the cover window in the folding part (F) may be appropriately about 10 to 100 μm.

The cover window in the present disclosure is formed with a thickness of about 30 to 300 μm based on glass and is chemically reinforced and used. In this thickness, the width and depth of the folding part (F) are appropriately designed as described above. If the cover window is thinner than the thickness described above, the thickness of the folding area of the cover window becomes too thin after the folding part (F) formation, and thus the above problems occur. Even if the cover window is thicker than the thickness described above, the flexibility, resilience, and elasticity are reduced based on the glass described above, and the weight reduction of the display product is hindered.

According to an embodiment of the present disclosure, the folding part (F) is formed in a shape in which the folding part (F) of the cover window is slimmed inward and is generally formed in a rectangular trench shape. An inclined part with a thickness gradually thickening in the folding part (F) may be formed at both side ends of the folding part (F) so as to be connected to a plane part of the cover window.

In particular, by forming inclined parts with a low slope at both ends (a boundary part with the flat part (P)) of the folding part (F), the size of the reflection angle by the reflection surface is similarly adjusted in the entire region of the folding part (F), hence minimizing the interference of light and visual visibility on the reflection surface.

In addition, etching patterns may be formed on the folding part (F) and the plane part (P) or the folding part (F) in order to improve strength and folding characteristics on the glass substrate 100.

In this present disclosure, the cover window is formed on the front surface of the display panel to protect the display panel by maintaining folding and strength characteristics and may be disposed on a Clear Polyimide (CPI) cover to protect the CPI cover.

As described above, the present disclosure is to provide a flexible cover window that is formed on a glass-based and has a folding part (F) that is a thin plate and has reinforced strength and folding characteristics so as to be applied to a flexible display, and a glass substrate 100 constituting the flexible cover window may be integrally formed to have the same thickness in the entire region, or a slimming portion having a thinner thickness than that of the plane part (P) may be formed.

First, in the method for manufacturing a flexible cover window, according to the present disclosure, the folding part (F) is formed on one or both surfaces of a glass substrate.

A photoresist layer is formed on the glass substrate to form the folding part (F), and the resist layer is patterned to form a resist pattern layer having an open region for forming the folding part (F) on the glass substrate.

The photoresist layer is formed by laminating a photoresist coating, or dry film resist (DFR) on the glass substrate and patterning the resist layer to form a resist pattern layer for forming the folding part (F) on the glass substrate. After that, the folding part (F) is formed using the resist pattern layer as a mask.

The folding part (F) may be formed using the pattern layer as a mask by at least one or a combination of two or more of the masking processes using wet etching, polishing, laser forming, masking ink, or dry film photoresist (DFR), or by the masking processes using such as wet etching, laser forming as a post-process.

In an embodiment of the present disclosure, after laminating DFR on the glass substrate, wet etching is performed using the DFR as a wet mask to form the folding part (F). Here, the inclined part of the folding part (F) is formed while the etching solution penetrates between the DFR and the glass substrate due to the lifting of the end of the folding part (F) side of the DFR.

According to the shape of the designed folding part, the slope of the inclined part or the length of the effective area of the inclined part, process conditions such as the thickness of the DFR, the degree of the lifting of the DFR at the end of the folding part (F), the concentration of the etchant, the temperature, and the etching time are adjusted.

The effective area (L) of the inclined part is determined according to the inclination of the inclined part, and about 50 to 5000 μm is suitable. In this case, the inclination (A) of the inclined part preferably has a slope (A) of 1 to 20° with respect to the plane part (P).

The inclination of the inclined portion is to minimize the visibility of the boundary part due to light reflection. That is, when there is no inclination of the inclined part (boundary) (90°), the reflective surface at the boundary is visually recognized by the plane part (P) side reflection, thereby reducing distortion or resolution of the screen. In the present disclosure, the folding part (F) and the plane part (P) are connected at a gentle slope to minimize the visibility of the boundary part.

As described above, the present disclosure provides to simultaneously reinforce the plane part and the folding part by using an alkali-based metal ion having an ionic radius smaller than that of the alkali-based metal ion contained in the glass substrate on which the folding part is formed.

According to the present disclosure, alkali-based metals used in the chemical reinforcing process are shown in Table 1 below.

TABLE 1

| Division | Li | Na | K |
|---|---|---|---|
| Atomic number | 3 | 11 | 19 |
| Atomic weight(u) | 6.941 | 22.989769 | 39.0983 |
| Atomic weight(g) | 1.15E−23 | 3.82E−23 | 6.49E−23 |
| Melting point (° C.) | 180.5 | 97.79 | 63.5 |
| Atomic radius (pm) | 152 | 190 | 243 |
|  | 0.8 times sodium |  | 1.28 times sodium |

When alkali glass is immersed in high-temperature $KNO_3$ molten salt, compressive stress is generated on the surface of the glass due to the replacement of K ions in the molten salt with Na ions in the glass.

At this time, the volume of the glass increases due to the influence of K ions having a large atomic size. On the other hand, in the case of Li ions, since the atomic radius is smaller than that of Na ions of the glass, the volume of the glass is reduced.

Figure 2:
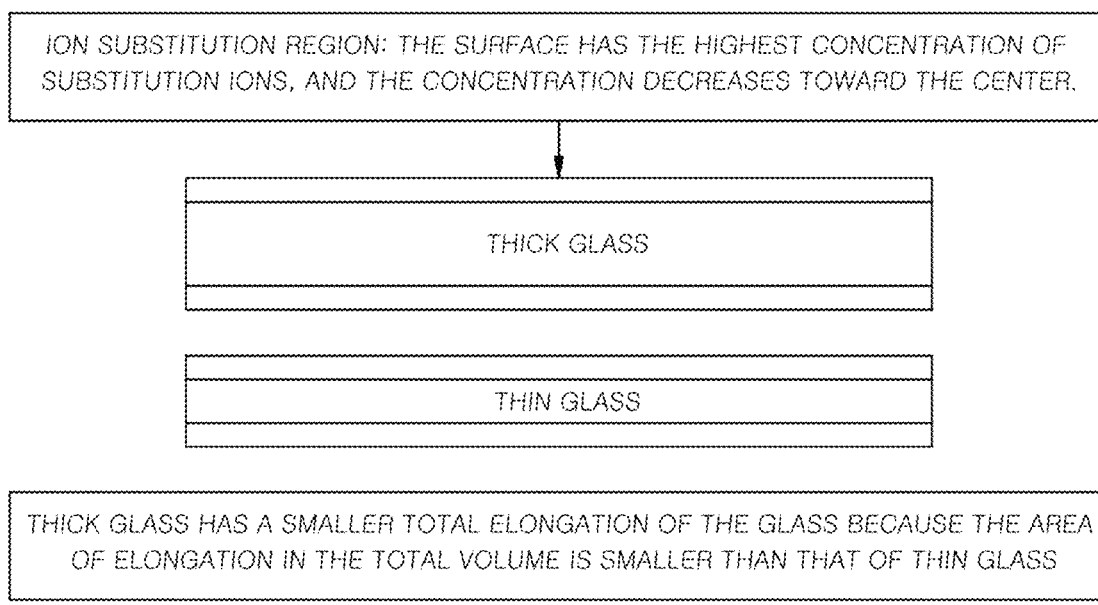
FIGS. 2 and 3 are schematic diagrams for explaining the principle of the present disclosure.

This feature is particularly conspicuous in the case of thin glass, which may be summarized as shown in Table 2 below. This is shown in FIG. 2.

TABLE 2

| Division | Thick glass | Thin glass |
|---|---|---|
| K | Small stretched | Greatly stretched |
| Li | Small reduced | Greatly reduced |

Tables 3 and 4 below measure the amount of change in length for each glass thickness in accordance with the amount of lithium added when lithium is not added to the molten salt and when lithium is added.

TABLE 3

| | Li-free | |
|---|---|---|
| Experimental | Glass thickness | |
| conditions | 40 um | 100 um |
| Condition A | 0.089 | 0.034 |
| Condition B | 0.110 | 0.048 |
| Condition C | 0.130 | 0.053 |
| Condition D | 0.151 | 0.061 |

TABLE 4

| | Li addition | |
|---|---|---|
| Experimental | Glass thickness | |
| conditions | 40 um | 100 um |
| Condition A | −0.115 | −0.049 |
| Condition B | −0.153 | −0.056 |

Referred embodiments of the present disclosure are as follows.

1) Method 1: Two-step reinforcement method

A. First reinforcement ($KNO_3$+$NaNO_3$+$LiNO_3$)

a. Control CS/DOL by setting $KNO_3$ to 20% to 70% b. $LiNO_3$ is added 0.1% to 5% to reduce the glass.

c. Reinforcing temperature is 350° C. to 460° C. and the time is 5 min~10 hr.

B. Secondary reinforcement (Table 5)

TABLE 5

| Reinforcing liquid type | Temperature | Time |
|---|---|---|
| $KNO_3$ 100% | 350° C. to 460° C. | 1 minute to 1 hour |
| $KNO_3$ (98% to 99.9%) + $LiNO_3$ (0.1% to 2%) | | |
| $KNO_3$ + $NaNO_3$ | | |

TABLE 5-continued

| Reinforcing liquid type | Temperature | Time |
|---|---|---|
| $KNO_3$ + $NaNO_3$ + $LiNO_3$ (0.1% to 2%) | | |

2) Method 2: One-step reinforcement method

A. $KNO_3$ 100% + $LiNO_3$ (0.1% to 5%)

B. $KNO_3$ 50% to 99% + $NaNO_3$ 1% to 50% + $LiNO_3$ 0.1% to 5%

※ The function of offsetting the length increase that occurs during K ion substitution through Li ion substitution (the amount of K ion substitution may be increased as the Li content increases)

Figure 3:
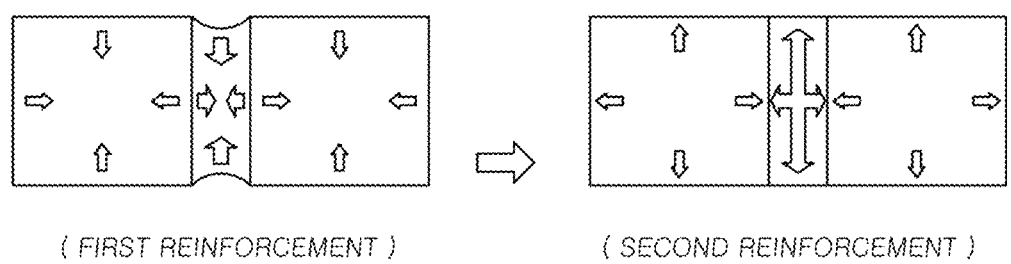

A principle according to an embodiment of the present disclosure is illustrated in FIG. 3.

As a whole, the stretched portion and the reduced portion are offset to reinforce the folding part and the plane part simultaneously, and the tensile stress of the entire area of the flexible cover window is adjusted to provide a flexible cover window secured strength and folding characteristics.

Figure 4:
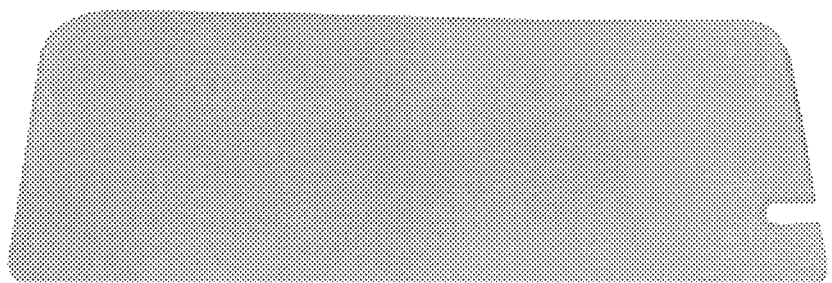
FIG. 4 is a view showing a photograph of a flexible cover window according to the present disclosure.

FIG. 4 shows a photograph of a flexible cover window manufactured according to an embodiment of the present disclosure. It was confirmed that deformation or bending, as in the related art, was minimized in the entire area of the folding part and the plane part.

As described above, the present disclosure is to prevent deformation, bending, and breakage due to a difference in tensile stress of a glass substrate after reinforcement due to a difference in thickness between a plane part and a folding part. By performing the chemical reinforcement process using metal ions, there is no need for an additional process such as a masking process in the existing partial chemical reinforcement process, thereby improving mass productivity.

Accordingly, by simultaneously chemically reinforcing the plane part and the folding part, problems of reinforcement non-uniformity such as dispersion and precision coating of the coating solution, which is a conventional partial chemical reinforcement process, and deviation of the upper and lower ends due to the stagnant phenomenon of the coating solutions, are completely solved. Since the masking process is not performed, the process may be simply performed.

What is claimed is:

1. A method of manufacturing a flexible glass cover window, the glass cover window comprising a plane part and a folding part, said method comprising:

an etching step for etching a glass substrate to form the folding part of the glass cover window wherein the folding part of the glass cover window has a thinner thickness than the plane part of the glass cover window, following the etching step, a first reinforcing step of immersing, simultaneously, the plane part and the folding part of the glass cover window comprising sodium ions in a first molten salt comprising potassium ions and lithium ions such that surfaces of the plane part and the folding part of the glass cover window directly contact with the first molten salt comprising potassium ions and lithium ions, thereby decreasing amounts of lengths of the plane part and the folding part, and subsequent to said first reinforcing step, a second reinforcing step of immersing, simultaneously, the plane part and the folding part of the glass cover window in a second molten salt comprising potassium ions such that the surfaces of the plane part and the folding part of the glass cover window directly contact with the second molten salt comprising potassium ions, thereby increasing the lengths of the plane part and the folding part and thus offsetting the decreases in the amounts of the lengths of the plane part and the folding part that occurred in the first reinforcing step, wherein the first molten salt used in the first reinforcing step comprises $KNO_3$, $NaNO_3$, and $LiNO_3$, wherein in the first reinforcing step, the content of $KNO_3$ is 20 to 70 parts by weight, based on a total weight of the first molten salt in the first reinforcing step, and the content of $LiNO_3$ is 1 to 5 parts by weight, based on the total weight of the first molten salt in the first reinforcing step, wherein, by using the first molten salt, the first reinforcing step is configured to reduce the length of the folding part having a relatively thin thickness to a relatively large extent, and to reduce the length of the plane part having a relatively thick thickness to a relatively small extent, wherein, by using the second molten salt, the second reinforcing step is configured to increase the length of the folding part having the relatively thin thickness to a relatively large extent, and to increase the length of the plane part having the relatively thick thickness to a relatively small extent, and wherein the first reinforcing step and the second reinforcing step are configured to combine to reduce deformation or bending in an entire area of the folding part and the plane part while reinforcing the folding part and the plane part simultaneously.

2. The method of claim 1, wherein the second molten salt used in the second reinforcing step comprises $KNO_3$ and any one or both of $LiNO_3$ and $NaNO_3$.

3. The method of claim 2, wherein the amount of $LiNO_3$ used in the second reinforcing step is equal to or less than the amount of $LiNO_3$ used in the first reinforcing step.

4. The method of claim 3, wherein in the second reinforcing step the content of $LiNO_3$ in the second total molten salt is 0.1 to 2 parts by weight, based on the total weight of the molten salt.

5. The method of claim 1, wherein the plane part has a thickness of 30 μm-300 μm, and the folding part has a thickness of 10 μm-100 μm.

6. The method of claim 1, wherein the second molten salt of the second reinforcing step consists of $KNO_3$.

7. The method of claim 1, wherein the method does not include a step of masking to provide partial chemical reinforcing.

8. The method of claim 1, wherein the first reinforcement step is carried out for a duration of 5 minutes to 10 hours.

9. The method of claim 1, wherein the second reinforcement step is carried out for a duration of from 1 minute to 1 hour.

* * * * *